(12) United States Patent
Schedler et al.

(10) Patent No.: US 7,940,880 B2
(45) Date of Patent: May 10, 2011

(54) FIRST-WALL COMPONENT WITH TUBE SEGMENT

(75) Inventors: Bertram Schedler, Reutte (AT); Thomas Huber, Breitenwang (AT); Anton Zabernig, Reutte (AT); Karlheinz Scheiber, Breitenwang (AT); Dietmar Schedle, Reutte (AT); Thomas Friedrich, Halblech (DE); Hans-Dieter Friedle, Häselgehr (AT); Sandra Mair, Reutte (AT); Nadine Wörle, Musau (AT)

(73) Assignee: Plansee SE, Reutte (AT)

( * ) Notice: Subject to any disclaimer, the term of this patent is extended or adjusted under 35 U.S.C. 154(b) by 906 days.

(21) Appl. No.: 11/634,651

(22) Filed: Dec. 6, 2006

(65) Prior Publication Data

US 2007/0137847 A1  Jun. 21, 2007

(30) Foreign Application Priority Data

Dec. 6, 2005  (AT) ............................ GM 830/2005 U

(51) Int. Cl.
*G21B 1/00* (2006.01)
(52) U.S. Cl. ..................... 376/100; 376/150; 376/136
(58) Field of Classification Search .................. 376/100, 376/150, 136
See application file for complete search history.

(56) References Cited

U.S. PATENT DOCUMENTS

| 2,856,905 | A | * | 10/1958 | Bowen, III | 122/236 |
| 3,333,123 | A | * | 7/1967 | Baumann | 310/11 |
| 4,582,728 | A | * | 4/1986 | Abe et al. | 427/249.19 |
| 4,696,781 | A | * | 9/1987 | Bourque | 376/136 |
| 4,852,645 | A | * | 8/1989 | Coulon et al. | 165/180 |
| 5,023,043 | A | * | 6/1991 | Kotzlowski et al. | 376/150 |
| 5,580,658 | A | * | 12/1996 | Maruyama et al. | 428/408 |
| 5,806,588 | A | | 9/1998 | Weeks, Jr. et al. | |
| 7,128,980 | B2 | * | 10/2006 | Schedler et al. | 428/553 |
| 2004/0195296 | A1 | * | 10/2004 | Schedler et al. | 228/194 |
| 2006/0052249 | A1 | * | 3/2006 | Schedler et al. | 505/325 |

FOREIGN PATENT DOCUMENTS

| EP | 0 666 670 A2 | 8/1995 |
| JP | 5-256968 | 10/1993 |

* cited by examiner

*Primary Examiner* — Rick Palabrica
(74) *Attorney, Agent, or Firm* — Laurence A. Greenberg; Werner H. Stemer; Ralph E. Locher

(57) ABSTRACT

The invention relates to a first-wall component of a fusion reactor, which comprises at least one heat shield of a graphitic material and a cooling tube of copper or a copper alloy. Arranged between the heat shield and the cooling tube is a tube segment, which is connected at least in certain regions to the heat shield and to the cooling tube via copper-containing layers.

13 Claims, 1 Drawing Sheet

FIRST-WALL COMPONENT WITH TUBE SEGMENT

CROSS-REFERENCE TO RELATED APPLICATION

This application claims the priority, under 35 U.S.C. §119, of Austrian application AT GM 830/2005, filed Dec. 6, 2005; the prior application is herewith incorporated by reference in its entirety.

BACKGROUND OF THE INVENTION

Field of the Invention

The invention relates to a first-wall component of a fusion reactor. The component has at least one heat shield of a graphitic material and a cooling tube of copper or a copper alloy. The heat shield has a closed or open passage.

A typical example of the use of such first-wall components is that of diverters and limiters, which are exposed to extremely high thermal loads in excess of 10 MW/m². First-wall components usually comprise a heat shield and a heat dissipating region. The material of the heat shield must be compatible with the plasma, have a high resistance to physical and chemical sputtering, a high melting point/sublimation point and be as resistant as possible to thermal shock. In addition, it must also have a high thermal conductivity, low neutron activation and adequate strength/fracture toughness, along with good availability and acceptable costs. Apart from refractory metals, such as tungsten for example, graphitic materials best meet this diverse and to some extent conflicting set of requirements. Since the energy flows from the plasma act on these components over a long period of time, such first-wall components are typically actively cooled. The heat removal is assisted by heat sinks, for example of copper or copper alloys, which are usually connected to the heat shield by a material bond.

The copper has the function of ensuring the heat removal. In addition, it may also perform the function of stress reduction, as is the case when graphite is connected to a high-strength copper alloy via an intermediate layer of pure copper (for example Cu—Cr—Zr). The copper layer thereby usually has a thickness of 0.5 to 3 mm.

Apart from the regions of graphite and one or more copper materials, such first-wall components may also have further regions, for example of steel or a tungsten alloy.

The joining region between the graphite and the copper in this case represents the weak point of such material composites. A method for producing cooling devices with improved strength in the joining region is described in European patent No. EP 0 663 670 B1. There, the metal of the cooling device in the molten state is brought into contact with a heat-resistant material, elements of one or more metals of the IVth and/or Vth subgroups of the periodic system being provided in the joining region during the connecting operation. Material composites produced in such a way have a much improved strength.

First-wall components can be made in different designs. A distinction is drawn here between flat tile, saddle and monobloc designs.

If a heat shield with a planar connecting area is connected to the heat sink through which coolant flows, this is referred to as a flat tile design. In the case of the saddle design, a heat shield with a semicircular recess is connected to a heat sink of a tubular form. The heat sink has in each case the function of establishing the thermal contact between the heat input side and the cooling medium and is thereby exposed to cyclical, thermally induced loads caused by the temperature gradient and the different coefficients of expansion of the elements joined together. In the case of the monobloc design, the first-wall component comprises a heat shield with a concentric passage. The heat shield is connected by means of this concentric passage to a cooling tube.

Owing to the geometrical conditions, the stress reduction brought about by plastic deformation of the copper intermediate layer takes place more effectively in the case of the flat tile design than in the case of the monobloc design, where there is a triaxial state of stress, which suppresses plastic deformation to the greatest extent. On account of this restricted stress reduction, cracks can therefore occur in the graphitic material.

First-wall components not only have to withstand thermally induced mechanical stresses but also mechanical stresses that additionally occur. Such additional mechanical loads may be produced by electromagnetically induced currents which flow in the components and interact with the surrounding magnetic field. This may involve the occurrence of high-frequency acceleration forces, which have to be transferred by the heat shield. However, graphitic materials have a low mechanical strength and fracture toughness. In addition, neutron embrittlement occurs during use, leading to a further increase in the sensitivity of these materials to crack initiation.

Fiber reinforced graphite (CFC, carbon fiber-reinforced carbon) is usually used as the graphitic material. The fiber enforcement is in this case three-dimensionally and linearly arranged. The architecture of the fibers provides the material with different properties, depending on the spatial direction. CFC is usually reinforced in one spatial direction by ex-pitch fibers, which have both the greatest strength and thermal conductivity. The two other spatial directions are reinforced by ex-PAN fibers (PAN, polyacrylonitrile), one direction typically only being needled.

Therefore, while CFC has a linear material architecture, the heat shield/cooling tube connection geometry in the case of the monobloc design is circular. On account of the different coefficients of thermal expansion of the materials used, a build-up of stresses occurs during the production process and may lead to cracks in the CFC.

On account of the geometrical conditions and the combination of materials used, these cracks can only be detected with very complex methods, if at all. Against the background of a nuclear environment for such components, this gives rise to corresponding problems, in particular also because cracks/detachments can be regarded as possible triggers of a more major incident.

In spite of many years of laborious development work in the field of first-wall components, the structural elements so far available do not optimally meet the set of requirements.

SUMMARY OF THE INVENTION

The object of the invention is therefore to provide a first-wall component of a monobloc design which meets the requirements resulting from mechanical and physical stresses in a suitable way.

With these and other objects in view there is provided, in accordance with the invention, a first-wall component of a fusion reactor, comprising:

at least one heat shield of a graphitic material formed with a closed or open passage;

a cooling tube of copper or a copper alloy;

a tube segment disposed between said heat shield and said cooling tube; and copper-containing layers connecting said tube segment at least in certain regions to said heat shield and to said cooling tube.

In other words, the first-wall component in this case comprises at least one heat shield of a graphitic material and a cooling tube of copper or a copper alloy, the heat shield having a closed or open passage and a tube segment being arranged between the heat shield and the cooling tube. The tube segment is respectively connected to the heat shield and the cooling tube via ductile copper layers.

The tube segment has the effect that the internal stresses in the heat shield, which result from the different coefficients of expansion, are reduced. In order to achieve this in an optimum way, it is advantageous if the coefficients of expansion of the heat shield and of the tube segment are similar and the tube segment has an adequate thickness of at least 0.2 mm, and a thermal conductivity and strength that are as high as possible. With smaller thicknesses, adequate reduction of the stresses is not accomplished. An upper limit of approximately 1.5 mm is attributable to geometrical conditions.

The mechanical/physical requirements on the tube segment are best met by materials from the group comprising molybdenum, molybdenum alloys, tungsten and tungsten alloys.

To be noted in particular are the pseudoalloys in the tungsten-copper system and in the molybdenum-copper system. In the case of tungsten-copper, the preferred copper content is 5 to 25% by weight, in the case of molybdenum-copper it is 15 to 40% by weight. The tube segment has with preference an opening angle $\alpha$ of from 20° to 180°, preferably from 50° to 130°. With larger opening angles, the reduction of the stresses is not adequate. With smaller opening angles, the heat flux is hindered.

It also proves to be favorable if the angle bisector of the opening angle $\alpha$ is perpendicular to the surface of the heat shield that is exposed to the plasma. The heat shield is connected to the tube segment via a copper-containing layer, the tube segment in turn likewise being connected to the cooling tube via a copper-containing layer. These layers likewise serve for stress reduction. The opening region of the tube segment is likewise filled with copper or a copper alloy, so that in this region the heat shield is connected to the cooling tube via this copper-containing region. As a result, in this region the heat flux is not impaired by the tube segment.

The passage through the heat shield is preferably closed and formed as a bore, the wall of which is structured by means of a laser, the wall being metallically and/or carbidically activated.

To produce the first-wall component according to the invention, firstly a passage, preferably a bore, is introduced into a block of a graphitic material, preferably CFC. The surface of the passage is structured, in a preferred way by means of a laser, and subsequently metallically and/or carbidically activated in such a way that the activated surface can be wetted by liquid copper. In the passage pretreated in such a way, the tube segment is subsequently inserted. The preferred thickness of the tube segment is in this case 0.2 to about 1.5 mm. The gap between the tube segment and the wall of the activated passage is approximately 0.2 to 0.8 mm. A sleeve of pure copper is introduced into this gap. A sleeve of pure copper is also positioned against the inside diameter of the tube segment. The construction produced in this way is heated under a vacuum or inert gas to a temperature above the melting point of copper. In order to ensure replenishment of copper, in particular in the gap between the CFC and the tube segment and in the opening region of the tube segment, a corresponding copper depot is provided.

This produces a composite with the following radial construction (from outside to inside): CFC/activation layer/copper/molybdenum-copper or tungsten-copper/copper.

A cooling tube of a copper alloy, preferably copper-chromium-zirconium, can be materially bonded to the inner copper layer by usual standard methods, such as soldering/brazing or HIP.

Other features which are considered as characteristic for the invention are set forth in the appended claims.

Although the invention is illustrated and described herein as embodied in first-wall component with tube segment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Example

Figure 1:
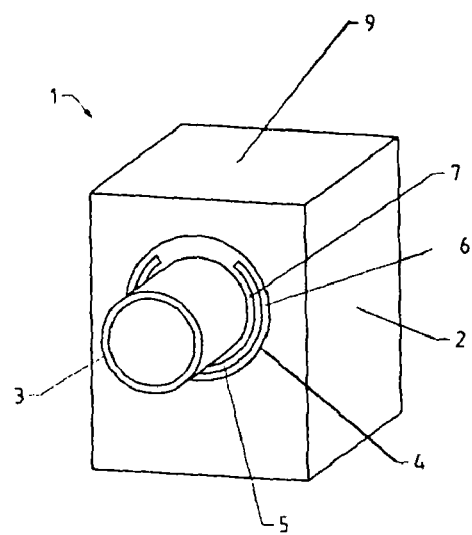
FIG. 1 perspective view of a first-wall component according to the invention.
Figure 2:
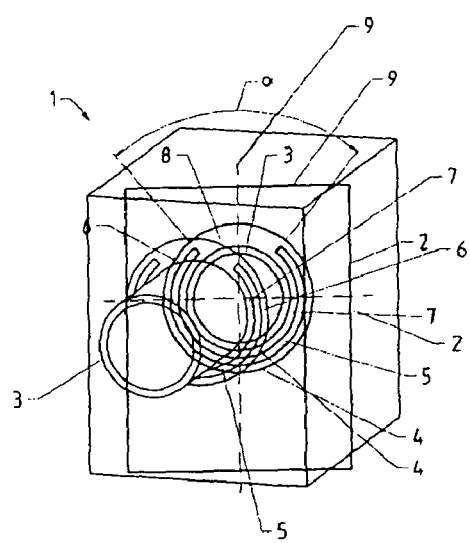
FIG. 2 is an elevational front view of the first-wall component according to the invention as shown in FIG. 1.
Figure 3:
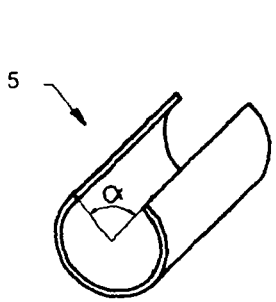
FIG. 3 is a perspective view of the tube segment.

For the production of a first-wall element 1, a CFC (carbon fiber-reinforced carbon) heat shield 2 with dimensions of 45 mm×30 mm×25 mm was used. The CFC heat shield 2 had a 3D fiber structure, different properties being obtained depending on the direction. The fibers with the highest thermal conductivity lay parallel to the outer dimension of 45 mm. The fiber bundles with the average thermal conductivity lay parallel to the outer dimension of 30 mm. The through-bore 4 with a diameter of 18 mm was introduced normal to the 30 mm×45 mm area, at its center of symmetry. This bore, 25 mm deep, was subsequently structured by way of a laser, achieving an increase in the surface area of over 100%. The conical laser bores had a depth of approximately 1000 μm, the opening width at the surface being approximately 200 μm. The sequence of laser pulses was in this case chosen such that the individual bores lay as close together as possible. The surface treated in this way was activated, so that a carbidically bonded surface wetted by liquid copper was created on the CFC material 2. This was achieved by titanium being applied to the surface. After that, the part was heated to a temperature above the melting point of titanium, the molten titanium penetrating into the CFC as a result of the capillary forces acting, thereby forming titanium carbide. Titanium carbide on the one hand adheres to the CFC by a very good chemical bond and on the other hand makes the heat shield 2 wettable for the liquid copper.

A pure copper foil with a thickness of 0.4 mm was then positioned in the activated bore 4 in such a way as to form a cylinder, which lay against the inner side of the bore in the heat shield 2. Subsequently, a tube segment 5 of W with 10% by weight Cu of a height of 25 mm, an outside diameter of 17 mm, a wall thickness of 0.5 mm and an opening angle α of 90° was introduced into the bore. The angle bisector of the opening angle α in this case lay perpendicular to the 45 mm×25 mm area. This area 9 is exposed to the plasma during use. A copper core with an outside diameter of 15.8 mm was positioned in the inner region of the tube segment 5, this core having a head with a diameter of 20 mm. This head performed the function of the melt depot. This assembly was subsequently installed in a vacuum furnace and heated under a vacuum for approximately 10 minutes to 1100° C., before the cooling phase was initiated.

In this way, the heat shield 2 was connected to the tube segment 5 via the copper layer 6. The opening region 8 of the tube segment 5 was likewise filled with copper. Subsequently, the monobloc produced in this way was worked on all sides. The original outer dimensions were thereby reduced by 1 mm in each case, whereby the monobloc had, before further processing, outer dimensions of 44 mm×29 mm×24 mm. The copper-filled passage 4 was drilled out to a diameter of 15 mm. The inside diameter in this case had a continuous copper layer 7. A copper-chromium-zirconium tube 3 with an outside diameter of 14.8 mm was then positioned in the passage 4. The cooling tube 3 and the monobloc were subsequently materially bonded by means of an HIP process, so that an actively coolable first-wall component 1 was obtained.

We claim:

1. A first-wall component of a fusion reactor, comprising:
    at least one heat shield of a graphitic material formed with a closed or open passage;
    a cooling tube of copper or a copper alloy;
    a tube segment disposed between said heat shield and said cooling tube, said tube segment consisting of a material selected from the group consisting of molybdenum, molybdenum alloy, tungsten and tungsten alloy, and said tube segment being formed with an opening facing towards a surface of said heat shield exposed to a plasma and having an opening angle α of from 20 to 180°; and
    copper-containing layers connecting said tube segment to said heat shield and to said cooling tube.

2. The first-wall component according to claim 1, wherein said opening angle α of said tube segment is 50° to 130°.

3. The first-wall component according to claim 1, wherein an angle bisector of said opening angle α is perpendicular to the surface of said heat shield exposed to a plasma.

4. The first-wall component according to claim 1, wherein said tube segment has a wall thickness of from 0.2 to 1.5 mm.

5. The first-wall component according to claim 1, wherein said heat shield is connected in a region of an opening of said tube segment to said cooling tube via a copper-containing region.

6. The first-wall component according to claim 1, wherein said tube segment consists of Mo—Cu or W—Cu.

7. The first-wall component according to claim 1, wherein said heat shield consists substantially of carbon fiber-reinforced carbon.

8. The first-wall component according to claim 1, wherein said cooling tube consists of Cu—Cr—Zr.

9. The first-wall component according to claim 1, wherein said passage is a bore.

10. The first-wall component according to claim 1, wherein said passage is a laser-structured opening.

11. The first-wall component according to claim 1, wherein said passage has a wall formed of a titanium carbide layer.

12. A first-wall component of a fusion reactor, comprising:
    a heat shield of a graphitic material formed with a closed or open passage;
    a cooling tube of copper or a copper alloy;
    a tube segment disposed between said heat shield and said cooling tube, said tube segment having an opening with an opening angle α of from 20 to 180°; and
    copper-containing layers connecting said tube segment to said heat shield and to said cooling tube.

13. The first-wall component according to claim 12, wherein said heat shield is connected in a region of said opening of said tube segment to said cooling tube via a copper-containing region.

* * * * *